United States Patent
Lindemann et al.

(10) Patent No.: US 9,020,671 B2
(45) Date of Patent: Apr. 28, 2015

(54) VEHICLE CONTROL USING AN ESTIMATED OUTSIDE AIR TEMPERATURE

(75) Inventors: Todd P. Lindemann, Howell, MI (US); Christopher A. Kinser, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 656 days.

(21) Appl. No.: 13/400,302

(22) Filed: Feb. 20, 2012

(65) Prior Publication Data

US 2013/0218378 A1 Aug. 22, 2013

(51) Int. Cl.
*B60L 3/12* (2006.01)
*B60L 11/18* (2006.01)
*G01C 21/34* (2006.01)

(52) U.S. Cl.
CPC .................. *G01C 21/3469* (2013.01)

(58) Field of Classification Search
USPC ........................................................... 701/22
See application file for complete search history.

(56) References Cited

U.S. PATENT DOCUMENTS

| | | | |
|---|---|---|---|
| 7,470,059 B2 * | 12/2008 | Yoshida et al. ............... | 374/102 |
| 8,594,918 B2 * | 11/2013 | Meyer-Ebeling et al. .... | 701/123 |
| 8,643,467 B2 * | 2/2014 | Chutorash et al. ........... | 340/5.71 |
| 2006/0217857 A1 * | 9/2006 | Yoshida et al. ................. | 701/31 |
| 2007/0284163 A1 | 12/2007 | Heap et al. | |
| 2008/0249745 A1 | 10/2008 | Heap et al. | |
| 2010/0094496 A1 * | 4/2010 | Hershkovitz et al. ........... | 701/22 |
| 2010/0171588 A1 * | 7/2010 | Chutorash et al. ........... | 340/5.71 |
| 2011/0112710 A1 * | 5/2011 | Meyer-Ebeling et al. ...... | 701/22 |
| 2011/0166810 A1 | 7/2011 | Grider et al. | |
| 2011/0301790 A1 * | 12/2011 | Atluri et al. ..................... | 701/22 |
| 2013/0110376 A1 * | 5/2013 | Surnilla et al. ................ | 701/103 |

FOREIGN PATENT DOCUMENTS

| | | |
|---|---|---|
| CN | 2338197 Y | 9/1999 |
| CN | 101734160 A | 6/2010 |

* cited by examiner

*Primary Examiner* — Shelley Chen
(74) *Attorney, Agent, or Firm* — Quinn Law Group, PLLC

(57) ABSTRACT

A vehicle includes a vehicle system, an outside air temperature (OAT) sensor, a clock, and a controller. The controller includes recorded garage temperatures and actual OAT profiles. At the key-on event, a controller-executed method includes recording an initial temperature reading from the OAT sensor and corresponding time of day from the clock. The controller determines whether the vehicle is in a garage using the profile of recorded temperatures and the time of day, and estimates an OAT for the corresponding time of day when the vehicle is in the garage. An operation of the vehicle system is controlled using the estimated OAT before the vehicle leaves the garage. The system may be a navigation system, and the operation may be modification of a calculated electric vehicle range. The system may be an HVAC or other system in another embodiment.

15 Claims, 1 Drawing Sheet

VEHICLE CONTROL USING AN ESTIMATED OUTSIDE AIR TEMPERATURE

TECHNICAL FIELD

The present disclosure relates to a system and method for estimating outside air temperature and controlling a vehicle operation using the estimated value.

BACKGROUND

Battery electric vehicles (BEVs) and extended-range electric vehicles (EREVs) can operate in an electric-only drive mode, also referred to as electric vehicle (EV) mode. When operating in EV mode, output torque delivered to the drive wheels is provided solely by a high-voltage electric traction motor using electrical power drawn from a rechargeable battery module. While EREVs use a small onboard gas engine to extend the EV range as needed. However, a BEV will become inoperable if the battery module is depleted before reaching the driver's intended destination. Therefore, accurate EV range information is essential to proper trip planning for a BEV driver, and may also be useful to drivers of EREVs who wish to limit the use of the onboard gas engine.

SUMMARY

A system and a method are disclosed herein for controlling a vehicle operation using an estimated outside air temperature. The present approach determines whether a vehicle, upon start up, is presently parked in a garage or other enclosed/covered shelter. A temperature sensor measures the initial outside air temperature (OAT) at a location immediately outside of the vehicle, e.g., using a thermocouple mounted anywhere on the outside of the vehicle. This information is compared to prior recorded temperature profiles to determine if the vehicle is likely located within a garage/shelter.

If the vehicle is in the garage at start up, an estimated OAT is determined from the measured initial OAT using a profile of recorded temperatures. The estimated OAT may be used to adjust a vehicle control value, for instance a calculated remaining electric vehicle (EV) range, a heating, ventilation, and air conditioning (HVAC) setting, a diagnostic setting, or another suitable value.

In particular, a vehicle is disclosed herein that includes a vehicle system, an OAT sensor, a clock, and a controller. The controller is in communication with the OAT sensor and the clock, and has tangible, non-transitory memory on which is recorded a profile of recorded temperatures. The profile includes a garage temperature profile and a separate actual OAT profile, both of which are recorded historic temperature values from a predetermined number of prior samples at the same or similar time of day, for instance the last two or three measurements taken at the same time of day on preceding days.

The controller detects a key-on event of the vehicle and thereafter records an initial OAT reading from the OAT sensor and the corresponding time of day for that particular reading. The controller then determines whether the vehicle is located in a garage or other shelter i.e., is not parked outside such that estimation of OAT is not required. Using the profile of recorded temperatures and the time of day, the controller estimates the OAT for the corresponding time of day if in the garage. The controller thereafter controls an operation of the vehicle system using the estimated OAT, and can do so before the vehicle leaves the garage.

The vehicle may include an electric fraction motor that generates motor output torque to propel the vehicle, and may also include a rechargeable energy storage system (RESS) or other battery that supplies electrical energy to the traction motor. In such an embodiment, the system may be a navigation system that displays a calculated EV range, and the operation of the vehicle system may be a modification of this calculated EV range as a function of the estimated OAT. The controller in such an embodiment may calculate the EV range using, by way of example, state of charge and capacity information from the RESS.

The function in one possible embodiment may be a multiplication of the calculated EV range by a calibrated gain corresponding to the estimated OAT. This range may not be linear. That is, as known in the art temperature changes in some temperature ranges can affect the efficiency and performance of a battery more significantly than others. The gain can be calibrated to reflect this reality as explained herein. The controller may determine whether the vehicle is located in a garage by calculating a difference between the garage temperature profile and the actual OAT profile for a corresponding time of day, and by comparing the calculated difference to a calibrated threshold. In this embodiment, only differences exceeding the threshold will trigger a particular control action.

In other embodiments, the vehicle system may be an HVAC system. In such embodiments, the operation of the vehicle system may be a setting of the HVAC system.

A method is also disclosed that includes detecting a key-on event in a vehicle, recording, via a controller, an initial OAT reading from an OAT sensor positioned on the vehicle, and recording, via the controller, the time of day of the initial temperature reading. The method also includes determining, in response to the detected key-on event, whether the vehicle is located in a garage using a profile of recorded temperatures and the time of day. Additionally, the method includes estimating an OAT for the corresponding time of day when the vehicle is in the garage, and then controlling an operation of a vehicle system using the estimated OAT before the vehicle leaves the garage.

The above features and advantages and other features and advantages of the present invention are readily apparent from the following detailed description of the best modes for carrying out the invention when taken in connection with the accompanying drawings.

DETAILED DESCRIPTION

Figure 1:
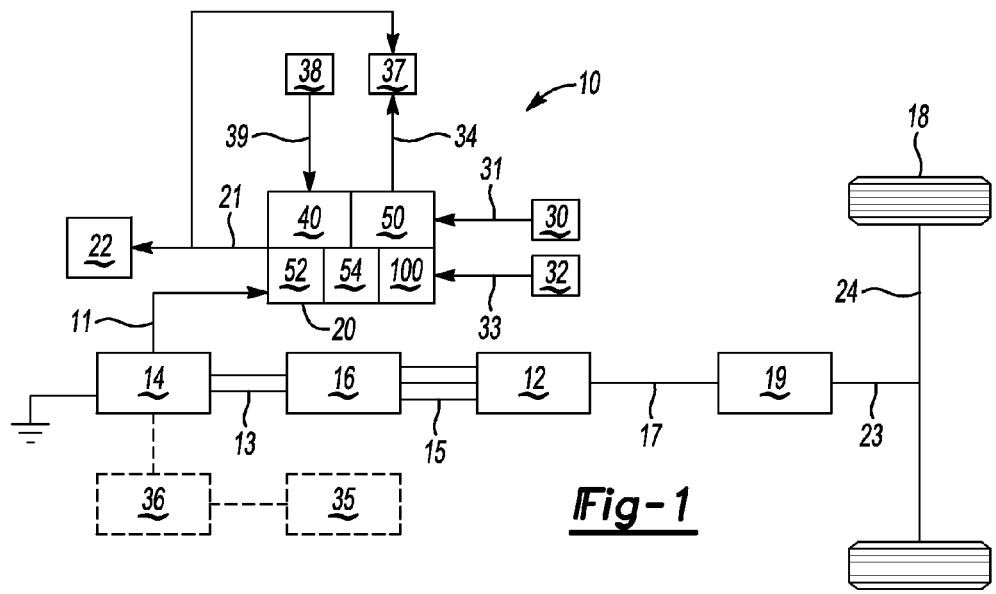
FIG. 1 is a schematic illustration of a vehicle having a controller which executes a method to thereby selectively estimate outside air temperature and uses this estimated value to control an operation of the vehicle.

Referring to the drawings, wherein like reference numbers correspond to like or similar components throughout the several figures, a vehicle 10 is shown schematically in FIG. 1. The vehicle 10 may be a battery electric vehicle (BEV), an extended range electric vehicle (EREV), a plug-in hybrid vehicle, etc. The vehicle 10 includes a controller 20 which executes instructions embodying a method 100 to thereby estimate the outside air temperature (OAT) with respect to the location of the vehicle 10. Using this information, the controller 20 determines whether the vehicle 10 is located in a garage or other shelter at start up/key-on using a profile of recorded temperatures 40 and current temperature measurements, as will be explained in further detail below with particular reference to FIGS. 2 and 3.

The example vehicle 10 of FIG. 1 includes a high-voltage electric traction motor 12 or multiple traction motors depending on the vehicle design. The traction motor 12 may be embodied as a multi-phase electric machine that is electrically connected to a rechargeable energy storage system (RESS) 14, e.g., a multi-cell direct-current (DC) battery module, via a power inverter module (PIM) 16. While not shown for simplicity, the vehicle 10 may also include an auxiliary power module which converts high-voltage DC power from the RESS 14 to a lower voltage level suitable for powering auxiliary systems aboard the vehicle 10. A DC bus 13 may be used to electrically connect the RESS 14 to the PIM 16. Likewise, a multi-phase alternating-current (AC) bus 15 may be used to electrically connect the PIM 16 to the traction motor 12.

The traction motor 12 includes an output shaft 17 that is operatively connected to an input member (not shown) of a transmission 19. The transmission 19 may include various gear elements and clutch sets (not shown) for transferring motor torque at a variety of desired speed ratios. The transmission 19 includes an output member 23 that delivers output torque from the transmission 19 to a drive axle 24 to thereby propel the vehicle 10 via a set of drive wheels 18. When the vehicle 10 is configured as an EREV, a small internal combustion engine 35 may be used to power a generator 36 for recharging the RESS 14, as is well understood in the art. The RESS 14 may be recharged using other means as well, for instance via regenerative braking, connection to an external power outlet, etc.

As noted above, the controller 20 of FIG. 1 selectively executes the present method 100 to detect whether the vehicle 10 is parked in a garage or other structure at start up/key-on. If presence in a garage is detected, the controller 20 estimates the outside air temperature (OAT) and uses the estimated OAT to control an operation of a vehicle system 37 before leaving the garage. An example operation as detailed herein is the selective modification of a calculated remaining EV range at the onset of a trip. Other example operations exist such as control over settings or control values of a heating, ventilation, and air conditioning (HVAC) system or a diagnostic system.

The system 37 may be a navigation system in communication with a vehicle display screen 22. In this example embodiment, the controller 20 may selectively output a range modifier value (arrow 21) to the system 37 and/or the display screen 22 as shown. The range modifier value (arrow 21) mathematically modifies a separately calculated remaining EV range and presents the modified EV range information to a driver via the display screen 22. The controller 20 may also or alternatively output another action modifier (arrow 34) to the vehicle system 37. In such an embodiment, the action modifier (arrow 34) can be used in a manner that varies with the design of the vehicle system 37, e.g., HVAC settings could be changed for an HVAC system, sensor settings could be changed for a diagnostic system, etc.

Still referring to FIG. 1, the controller 20 may be configured as a single or a distributed digital computer generally comprising a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. At least some of the memory, particularly any memory used to record the instructions needed for executing the method 100, is tangible and non-transitory.

The controller 20 is in signals communication with an outside air temperature (OAT) sensor 30. The OAT sensor 30 may be a single thermocouple or other suitable temperature sensor positioned on the vehicle 10 and exposed to the ambient, e.g., positioned in or behind a forward grill (not shown) of the vehicle 10 or mounted to any suitable external surface of the vehicle 10. The OAT sensor 30 transmits the measured OAT (arrow 31) to the controller 20 as an initial OAT value for use in executing the present method 100.

The controller 20 of FIG. 1 is also in signals communication with a clock 32. The clock 32 may be an integral part of the controller 20, for example an internal logical or physical time clock used by a hardware device of the controller 20. Alternatively, the clock 32 may be an available onboard clock such as the type used in a typical instrument panel, or it may be a separate device. In some embodiments, the clock 32 may be external to the vehicle 10, and may broadcast the clock signal (arrow 33) to the vehicle 10, e.g., via satellite, cell tower, radio tower, and the like. The controller 20 uses the clock signal (arrow 33) to determine the time of day corresponding to any initial temperature measurements provided by the OAT sensor 30 during the execution of the present method 100.

With respect to the operation of the controller 20, one or more data recorders 50 may be used to accumulate measured or received data. Such data can be used by the controller 20 and/or the vehicle system 37, when it is configured as a navigation system, to calculate a remaining EV range for the vehicle 10 as a function of the electrical state of the RESS 14 and drive history of the vehicle 10. For instance, the state of charge (SOC) of the RESS 14 will gradually or rapidly deplete depending how the vehicle 10 is driven, including the terrain, distance, traffic conditions, driving style of the driver, etc. Thus, the controller 20 and/or vehicle system 37 may take such factors into consideration in order to determine a theoretical maximum EV range. Therefore, the SOC as well as battery capacity are collectively captured as a set of battery state signals (arrow 11) and communicated to/pulled by the controller 20.

Over time, the controller 20 of FIG. 1 may record the ratio of distance traveled over energy used, and may store that information via one of the data recorders 50. The recorded ratios may be multiplied by the remaining usable energy left in the RESS 14 to determine the remaining distance, i.e., the EV range. The remaining energy in this calculation may be calculated by multiplying the capacity of the RESS 14 by the remaining SOC. If the driver is a relatively aggressive driver, the ratio for that driver will be less than a driver who regularly drives in a more conservative manner.

Within the data recorders 50, two data accumulators may be used for distance and energy, including a short term accumulator (STA) 52 and a long term accumulator (LTA) 54. The STA 52 differs from the LTA 54 in that the STA 52 records less data, and adapts quickly to new driver inputs such as increasing the vehicle speed or traveling uphill. The LTA 54 keeps a longer history of driver information such that a more predictable EV range estimation can be given over the course of, for instance, several weeks of driving. The STA 52 and the LTA 54 may work together to provide an accurate range prediction for a new driver or a new driving route, but can maintain the history for the regular driver and/or regular route.

While driving, normal EV range calculation and display may be based on the data residing in the STA 52. When the vehicle 10 of FIG. 1 is plugged in for charging, the data in the LTA 54 may be copied and rescaled into the STA 52 so as to ensure that the most accurate driving profile is used for the range prediction the next time the vehicle 10 is started. Such a start event may be readily detected via the position of a key 38 or other suitable on/off state indicator such as a push button or switch, with a key status (arrow 39) transmitted to the controller 20.

Figure 2:
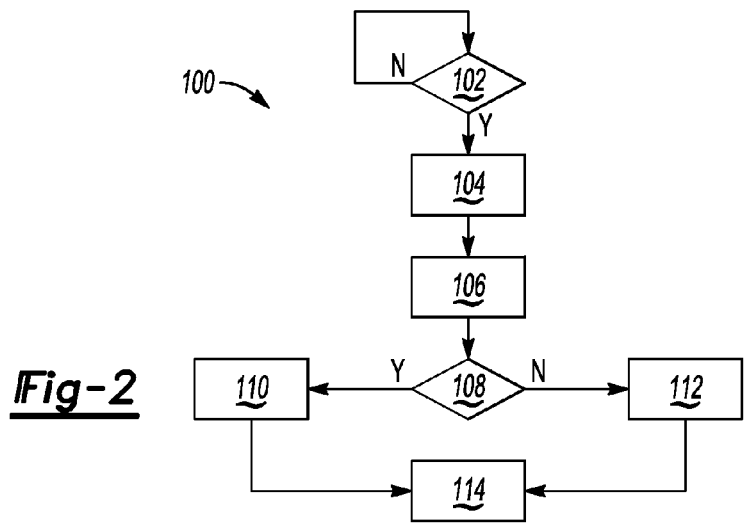
FIG. 2 is a flow chart describing an example method executable by the controller shown in FIG. 1.

Referring to FIG. 2, an example embodiment of the method 100 begins with step 102, wherein the controller 20 of FIG. 1 determines from the key status (arrow 39) if a vehicle start event/key-on state is presently active. Step 102 is repeated until an active key-on state is detected, after which the method 100 proceeds to step 104. When used, the STA 52 and LTA 54 described above may continue to accumulate energy use, drive history, and other data without respect to the progression of method 100.

At step 104, the OAT sensor 30 of FIG. 1 measures the OAT and communicates this information to the controller 20 of FIG. 1 as the measured OAT (arrow 31). The controller 20 records this initial OAT information, and thereafter the method 100 proceeds to step 106.

At step 106, the time of day from the clock 32 of FIG. 1 corresponding to the measured OAT (arrow 31) is communicated to the controller 20 as the clock signal (arrow 33). The clock signal (arrow 33) is recorded by the controller 20. The method 100 then proceeds to step 108.

Figure 3:
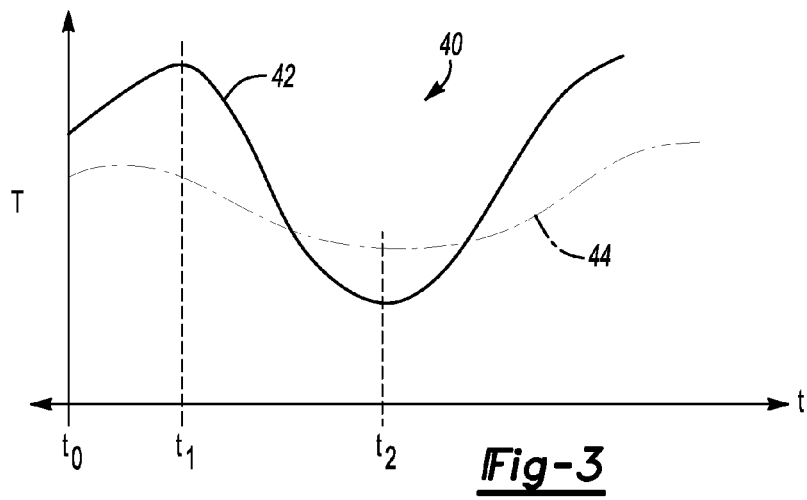
FIG. 3 is an example time plot of changing garage temperatures and outside air temperatures.

At step 108, the controller 20 of FIG. 1 uses the collected information from steps 102-106 and the temperature profiles 40, an example of which is shown in FIG. 3, to determine whether the vehicle 10 is presently located in a garage or other such shelter, or is parked outside of such a structure and is thus exposed directly to the true/actual outside air temperature.

Referring briefly to FIG. 3, the temperature profiles 40 describe changing temperature, i.e., value T as denoted on the vertical axis, over time (t) as denoted on the horizontal axis. The actual OAT and the garage temperature are recorded as traces 42 and 44, respectively. The garage temperature (trace 44) of a typical unheated garage will tend to vary less significantly over the course of a day than the actual outside temperature (trace 42). Naturally, climate-controlled garages will tend to have a more consistent temperature. If the garage temperature is substantially constant, there may be insufficient differentiation to enable as effective a use of the present method 100. Even in a typical garage, the level of insulation and the size of the garage, and to some extent its contents, will affect the traces 42, 44. Therefore, FIG. 3 is merely illustrative of an example garage and as such is non-limiting.

The profiles 40 are recorded over time such that a baseline exists to which comparisons can be made at vehicle start up. In one possible embodiment, the profiles 40 may be segmented into multiple time segments, e.g., t0-t1, t1-t2, etc. Each segment may correspond to a particular time of day, e.g., early morning until noon, afternoon, and night. Comparisons may be made in the same time segment for further accuracy. Such time segmentation may facilitate comparison of garage and outside temperatures at similar times of day to improve the overall accuracy of the method 100, particularly of step 108. In one embodiment, the average of the previous two or three temperatures can be used that are taken at the same time of day or in the same time segment.

Referring again to step 108 of FIG. 2, this step may entail calculating a difference between the measured OAT and the historic temperature/average of temperatures at the same time of day. That is, when the vehicle 10 of FIG. 1 is parked in a garage, the OAT sensor 30 will measure an initial OAT value that is not the true OAT. As shown in FIG. 3, at various times the garage temperature will exceed, be equal to, or be less than the true OAT, i.e., the ambient temperature outside of the garage. If the absolute value of the difference in temperatures is less than a calibrated threshold, the controller 20 may determine that the vehicle 10 is in a garage or shelter. In this case, the method 100 may proceed to step 110. Otherwise, the controller 20 may determine that the vehicle 10 is outside, and will thereafter proceed to step 112.

At step 110, having determined that the vehicle 10 of FIG. 1 is located in a garage, the controller 20 determines that the OAT sensor 30 is not providing the true OAT. As a result, the controller 20 will not use the initial OAT as measured by the OAT sensor 30. Instead, the controller 20 estimates the OAT for that time of day using the recorded temperature profiles 40. That is, in the example of FIG. 3 the controller 20 could look at trace 42 for a particular time of day and pull the value from trace 42 corresponding to that time of day. Trace 42 may be an average of actual OATs for the corresponding time of day, regardless of how these temperatures are determined. For instance, trace 42 could be generated using the OAT 30 during actual drives, and/or trace 42 can be developed over time using weather information communicated to the vehicle 10 by broadcast, e.g., cell towers, radio towers, and the like.

Step 110 of FIG. 2 includes executing a first vehicle control action which modifies an operation or value of the vehicle system 37 of FIG. 1. Such an action may include outputting the range modifier (arrow 21) shown in FIG. 1 to thereby change the estimated remaining EV range to be displayed to a driver via the display screen 22. Such an EV range can be calculated using state information (arrow 11) of the RESS 14, for instance using the collected data from the STA 52 and the LTA 54 as described above.

As part of step 110, modification may include applying a calibrated gain to the calculated EV range based on the estimated OAT. For instance, a gain of between 0 and X may be applied, with X being some maximum value such as 1.5 which caps the possible range adjustment. The selected gain value can depend on the particular estimated OAT. On particularly cold or hot days, the RESS 14 may be unable to power the vehicle 10 as efficiently as it could on a warmer day. A gain closer to 0 could be applied here to reduce the EV range that would otherwise be displayed to a user, thus providing a more realistic EV range estimate. Likewise, when estimated OAT lies within a particular band of temperatures, for instance about 15° C. to about 30° C., minimal or no adjustment may be made, as this region is generally known to correspond to minimal comfort/efficiency losses in kWh per charge.

Additionally, step 110 of FIG. 2 makes the modification to estimated EV range before a driver commences a trip. For BEV drivers in particular, EV range is a concern given the potential lack of charging stations along a travel route. A driver wants to be certain of reaching their intended destination, with EV range anxiety resulting when the driver cannot be certain of the accuracy of the calculated EV range at the trip planning stage. The present method thus results in adjustment to the remaining EV range while the vehicle 10 is still parked in the garage. If the readings from the OAT sensor 30 were used in this instance as true readings, the controller 20 could generate an inaccurate EV range given the potentially wide variance between the measured garage temperature and the true OAT. The method 100 proceeds to step 114 after completing step 110.

At step 112, the controller 20 of FIG. 1, having determined at step 108 that the vehicle 10 is not in a garage, executes a second control action. The second control action may include using temperature measurements from the OAT sensor 30 rather than an estimated OAT to adjust the calculated EV range directly. As described above with respect to step 110, such modification may include applying a calibrated gain to the calculated EV range. Alternatively, step 112 may entail not using the OAT sensor 30 to adjust the calculated EV range. In this instance, the STA 52 and/or LTA 54 may be used as set forth above to calculate the remaining EV range using only the state values (arrow 11 of FIG. 1) and drive history. Once step 112 is complete, the method 100 proceeds to step 114.

At step 114, once the vehicle 10 has commenced travel the readings from the OAT sensor 30 of FIG. 1 and/or external temperature readings may be periodically sampled/received and recorded to update the temperature profile of the OAT, as exemplified by trace 42 of FIG. 3. Step 114 may include calculating an average of the last two or three temperatures for a given time of day, or using a rolling average of a larger calibrated sample size, possibly including using a circular buffer or array in this instance. The oldest data in a larger sample size can be deleted as new values are recorded so as to keep the profiles 40 of FIG. 3 closely associated with recently experienced temperatures, possibly weighting the more recent values more heavily than the older values. The method 100 commences anew with a new key-on event at step 102.

As will be appreciated by one of ordinary skill in the art, various systems can benefit from earlier knowledge of outside air temperatures, and thus steps 110 and 112 are not limited to modification of a calculated EV range. For instance, when parked in a 10° C. garage on a day in which the true OAT is −1° C., heat from an HVAC system, seat warmers, mirror heaters, and the like might be automatically activated before the driver has even left the garage. Likewise, foreknowledge of cold/hot temperature while still parked in the garage could be useful to a control decision executed by a transmission controller, an engine controller, a diagnostic system, or another vehicle system, any of which may embody the vehicle system 37 of FIG. 1.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an electric traction motor that generates motor output torque to propel the vehicle in an electric vehicle (EV) mode;
   a rechargeable energy storage system (RESS) that supplies electrical energy to the electric traction motor, wherein the RESS has a state of charge (SOC) and a capacity;
   a vehicle system including a navigation system configured to calculate a remaining EV range as a function of the SOC and the capacity of the RESS;
   an outside air temperature (OAT) sensor mounted outside of the vehicle;
   a clock; and
   a controller in communication with the OAT sensor and the clock, wherein the controller includes memory on which is recorded a garage temperature profile and an actual OAT profile;
   wherein the controller is configured to:
      detect a key-on event of the vehicle;
      record an initial temperature reading from the OAT sensor;
      record the time of day of the initial temperature reading, wherein the time of day is communicated to the controller by the clock;
      determine, in response to the key-on event, whether the vehicle is located in a garage using the garage temperature profile, the actual OAT profile, and the time of day;
      estimate an OAT for the corresponding time of day when the vehicle is in the garage; and
      control an operation of the vehicle system using the estimated OAT before the vehicle leaves the garage, including:
         if the vehicle is in the garage, modifying the calculated EV range using the estimated OAT before the vehicle leaves the garage; and
         if the vehicle is not in the garage, modify the calculated EV range using the measured OAT from the OAT sensor.

2. The vehicle of claim 1, wherein the function is a multiplication of the calculated EV range by a calibrated gain corresponding to the estimated OAT.

3. The vehicle of claim 1, wherein the controller is configured to determine whether the vehicle is located in a garage by calculating a difference between the garage temperature profile and the actual OAT profile for a given time of day, and thereafter comparing the calculated difference to a calibrated threshold.

4. The vehicle of claim 1, wherein the OAT sensor is a single thermocouple mounted to the vehicle.

5. The vehicle of claim 1, wherein the controller is configured to periodically sample temperature measurements from the OAT sensor while the vehicle is being actively driven, and to calculate and record an average of the sampled measurements as one temperature profile in the profile of recorded temperatures.

6. The vehicle of claim 1, wherein the vehicle system also includes a heating, ventilation, and air conditioning (HVAC) system, and wherein the controller is configured to control the operation of the vehicle system by adjusting a setting of the HVAC system, includes:
   if the vehicle is in the garage, adjusting the setting using the estimated OAT before the vehicle leaves the garage; and
   if the vehicle is not in the garage, adjusting the setting using the measured OAT from the OAT sensor.

7. A vehicle comprising:
   an electric traction motor that generates motor output torque to propel the vehicle in an electric vehicle (EV) mode;
   a rechargeable energy storage system (RESS) that supplies electrical energy to the traction motor, wherein the RESS has a state of charge (SOC) and a capacity;
   a navigation system configured to calculate a remaining EV range as a function of the SOC and the capacity of the RESS;
   an outside air temperature (OAT) sensor mounted to the vehicle;
   a clock; and
   a controller in communication with the RESS, the OAT sensor, and the clock, and having tangible, non-transitory memory on which is recorded a profile of recorded temperatures, wherein the profile of recorded temperatures includes a garage temperature profile and an actual OAT profile;
   wherein the controller is configured to:
      detect a key-on event of the vehicle;
      determine, in response to the key-on event, whether the vehicle is located in a garage by calculating a difference between the garage temperature profile and the actual OAT profile and comparing the difference to a calibrated threshold;
estimate an OAT when the vehicle is in the garage;
if the vehicle is in the garage, modify the calculated EV range using the estimated OAT before the vehicle leaves the garage; and
if the vehicle is not in the garage, modify the calculated EV range using the measured OAT from the OAT sensor.

8. The vehicle of claim 7, wherein the controller is configured to modify the calculated EV range by multiplying the calculated EV range by a calibrated gain corresponding to the estimated OAT.

9. The vehicle of claim 7, wherein the controller is configured to periodically sample measurements from the OAT sensor while the vehicle is being actively driven, and to calculate and record an average of the sampled measurements as one temperature profile in the profile of recorded temperatures.

10. The vehicle of claim 7, wherein the garage temperature profile and the actual OAT profile are a calculated average of previous respective garage and actual OAT measurements for the same time of day.

11. A method comprising:
detecting a key-on event in a vehicle having an electric traction motor configured to generate motor output torque to propel the vehicle in an electric vehicle (EV) mode, a rechargeable energy storage system (RESS) configured to supply electrical energy to the electric traction motor and having a state of charge (SOC) and a capacity;
recording, via a controller, an initial temperature reading from an outside air temperature (OAT) sensor;
recording, via the controller, the time of day of the initial temperature reading;
calculating a remaining EV range as a function of the SOC and the capacity of the RESS;
determining, in response to the detected key-on event, whether the vehicle is located in a garage using a profile of recorded temperatures and the time of day, wherein the profile of recorded temperatures includes a garage temperature profile and an actual OAT profile;
estimating an actual OAT for the corresponding time of day when the vehicle is in the garage; and
if the vehicle is in the garage, modifying the calculated EV range using the estimated OAT before the vehicle leaves the garage; and
if the vehicle is not in the garage, modifying the calculated EV range using the measured OAT from the OAT sensor mounted to the vehicle.

12. The method of claim 11, wherein calculating the EV range includes multiplying the calculated EV range by a calibrated gain corresponding to the estimated OAT.

13. The method of claim 11, wherein determining whether the vehicle is located in the garage includes:
calculating, via the controller, a difference between the garage profile and the actual OAT profile for a given time of day; and
comparing the calculated difference to a calibrated threshold.

14. The method of claim 11, further comprising:
periodically sampling measurements from the OAT sensor while the vehicle is being actively driven; and
calculating and recording an average of the sampled measurements as one temperature profile in the profile of recorded temperatures.

15. The method of claim 11, wherein the vehicle includes a heating, ventilation, and air conditioning (HVAC) system, the method further comprising:
if the vehicle is in the garage, adjusting a setting of the HVAC system using the estimated OAT before the vehicle leaves the garage; and
if the vehicle is not in the garage, adjusting the setting of the HVAC system using the measured OAT from the OAT sensor.

* * * * *